United States Patent
Sadler et al.

[15] 3,643,720
[45] Feb. 22, 1972

[54] FORAGE HARVESTER FEED ROLL DRIVE

[72] Inventors: Loren G. Sadler, Stevens; Thomas W. Waldrop, New Holland, both of Pa.

[73] Assignee: Sperry Rand Corporation, New Holland, Pa.

[22] Filed: Aug. 26, 1970

[21] Appl. No.: 66,942

[52] U.S. Cl. ..........................146/120, 56/DIG. 1, 198/167
[51] Int. Cl. .....................................A01d 57/00, A01d 69/00
[58] Field of Search..........................146/120, 107 T, 107 L; 56/DIG. 1; 198/167

[56] References Cited

UNITED STATES PATENTS 3,195,595  7/1965  Corwith et al. ..........................146/120
3,511,287  5/1970  Hoch et al. ..............................146/120
3,523,411  8/1970  Waldrop et al. ....................146/120 X

*Primary Examiner*—Willie G. Abercrombie
*Attorney*—Joseph A. Brown, John C. Thompson, James J. Kennedy and George C. Bower

[57] ABSTRACT

The drive for the floating and fixed feed rolls adjacent to the rotary cutter of a forage harvester comprises driven sprockets on the respective rolls, an input sprocket on the input drive and a pivotally mounted spring-loaded idler sprocket. The floating roll sprocket and the idler sprocket are rotatably attached at opposite ends to an arm pivotally mounted intermediately between the centers of the idler and floating sprockets to provide adequate arc of contact on the floating and fixed sprockets and a taut chain with variations in the floating roll.

9 Claims, 2 Drawing Figures

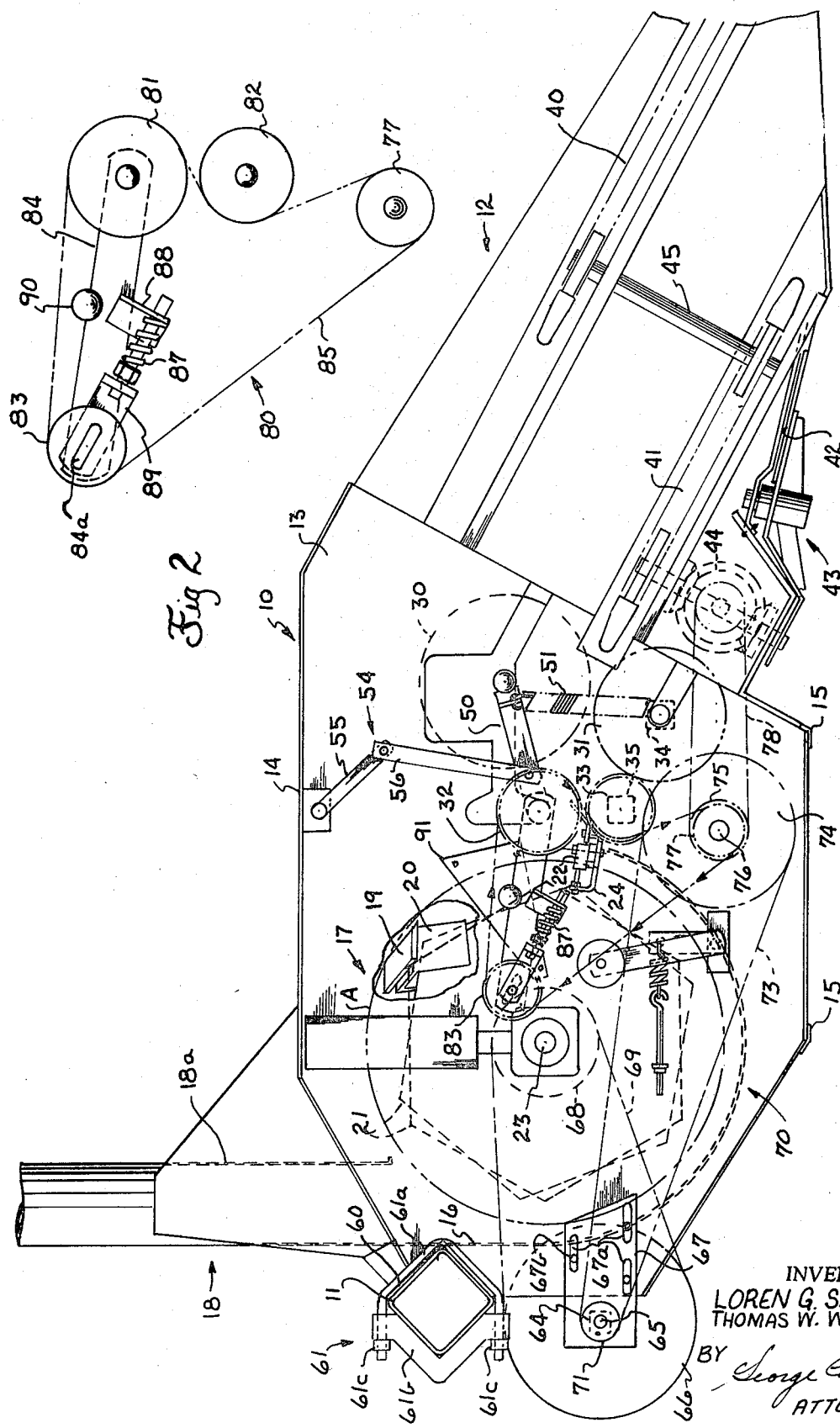

FORAGE HARVESTER FEED ROLL DRIVE

BACKGROUND OF THE INVENTION

This invention relates to the drive of the fixed and floating rolls that feed cut crops to the cutter of a forage harvester.

Forage harvesters may be of the self-propelled type, pull-type, or tractor-mounted type. A pickup header or row crop attachment is usually on the front of the harvester to cut the crop and deliver the crop to the forage harvester. The forage harvester receives the cut crop and has feed rolls to deliver the crop to the rotary cutter. The rear rolls, in addition to feeding, hold the crop during the cutting stroke so that the crop is chopped into small pieces. The rotary cutter discharges the chopped crop through a curved spout into a truck or trailing wagon for transporting the chopped crop to storage.

The cut crop is fed generally horizontally by an initial set of front lower fixed and upper floating rolls to a rear set of lower fixed and upper floating rolls. The rear set delivers the chopped crop to the cutter with a gripping hold on the fed crop. The front fixed lower roll has longitudinal ribs on its peripheral surface and the upper floating roll has serrated longitudinal ribs. The lower fixed rear roll has a smooth surface and the upper floating rear roll has longitudinally extending aggressive ribs for feeding and holding the crop against the lower smooth roll.

The two rear rolls are driven on the outboard side from an input drive sprocket by a single chain drive meshing with the rear feed roll sprockets and a spring-loaded idler sprocket.

The front rolls are driven by individual chain and sprocket drives on the inboard side of the forage harvester and are connected to inboard sprockets on the upper and lower rear rolls. Thus the front rolls are driven through the single chain drive and rear feed rolls. A single chain is used to drive the rear rolls for reduced costs and space limitations and by back wrapping the chain on the feed sprockets an inexpensive means is provided to counterrotate the rolls.

In the present single chain drives, the input sprockets is mounted below the roll sprockets and the idler sprocket. The four sprockets are in a generally vertical array. The floating roll is mounted on an arm secured to a pivot forward of the floating roll. The idler sprocket is mounted above the floating sprocket on an arm pivoted forward the idler sprockets. The idler sprocket is spring loaded away from the floating sprocket to adjust to the differences in chain path on a variation of the floating sprocket.

The floating rolls are mounted on floating members on opposite sides of the harvester. These members are interconnected by an equalizing linkage for the substantially uniform movement of the floating rolls in relation to the respective cooperating fixed rolls. The idler sprocket is mounted on a pivoted arm which is spring loaded against the chain. A shortcoming of this vertical arrangement is the contact arc or wrap of the chain on the floating sprockets is substantially short of an adequate wrap for the loads to be transmitted to the rear moveable or floating roll. Another shortcoming is that the idler sprocket compensates the changes in the length of the path of the chain under the loading of the idler spring. The chain tends to jump off the sprocket or slip. This action is highly undesirable since it limits the torque transmitted by the drive and results in the chain jumping under high-torque transmission.

The purpose of this invention is to provide a single chain drive for the rear upper and lower rolls of a forage harvester that can transmit high torques without the chain jumping and has adequate chain wrap on the fixed and floating sprockets for high torque transmissions.

Other further objects and advantages of this invention will be apparent from the following specification and dependent claims taken in connection with the drawings which illustrate the various features of this invention.

BRIEF DESCRIPTION OF THE DRAWINGS

FIG. 1 is an outboard side view of a tractor mounted forage harvester with a single row attachment mounted in front.

FIG. 2 is an outboard side view of the forage harvester single chain drive of the upper and lower rear feed rolls.

BRIEF DESCRIPTION OF THE PREFERRED EMBODIMENT

The forage harvester has a main casing 10 mounted on the right side of a tractor (not shown) by a transverse hitch bar 11 clamped to the rear of the casing. A single row harvesting attachment 12 is mounted on the front of the casing 10 to gather and cut a single row of crop such as corn and feed the cut crop to the forage harvester. The cutter 17 of the forage harvester chops the crop into small pieces and discharges it through the transition member 18 to a spout (not shown) for delivery to a truck or trailing wagon (not shown).

The casing 10 has two side sheets 13 on opposite sides of the casing, a top sheet 14, bottom straps 15, a cutterhead housing 16 for enclosing and supporting the operating elements of the forage harvester. The cutter 17 has two spaced sideplates 21 on shaft 23 which is rotatably mounted in bearings mounted on the side sheets 13 and has knives 19 fixedly attached by the respective U-shaped brackets 20. The brackets are mounted between the two spaced side rotor plates 21. A shear bar 22 extends across the forage harvester in cutting relation to the knives 19 and is adjustably supported on the two shear bar brackets 24 on the outer sides of the side sheets 13.

A crop is fed over the top of the shear bar 22 by the front feed rolls 30, 31 and the rear feed rolls 32, 33. The front feed rolls are at the front opening of the casing. The crop chopped by the cutter is carried along the housing 16 and discharges the crop through the transition member 18. The transition cutoff member 18a extends downward adjacent the subscribed cylinder "A."

The row crop attachment is of a conventional type and has upper and lower crop-gathering means 40, 41 for carrying the crop up the stalkway (not shown) to the sickle 42 reciprocated by the sickle drive 43. A lower crop-gathering means 41 tilts the cut crops to a generally horizontal position and feeds the ends of the crops between the front rolls. The front rolls draw the crop into the harvester and feed it to the rear rolls. The lower crop-gathering means are driven through the bevel gears 44 and the upper crop-gathering means is driven from the lower means by the shafts 45 rotatably mounted in the frame of the row attachment and fixedly connected to the forward sprocket of the lower crop gathering means and to the rear sprocket of the upper crop-gathering means 40.

The bottom front and rear rolls 31, 33 are rotatably mounted in bearings 34, 35 attached to the side sheets 13. The upper rolls 30, 32 are rotatably mounted in bearings at the opposite ends of the floating members 50. The floating members 50 are on opposite sides of the harvester and on the outer side of the sheets 13. Helical springs 51 on the opposite sides of the harvester are connected to the respective floating members 50 and lower part of the casing to hold the floating upper rolls 30, 32 in pressure-separating relationship with the associated fixed rolls 31, 33 respectively. As the crop passes through the rolls, the springs squeeze the crop and provide for separation of the rolls to accommodate the mat of cut crops. The equalizer linkage 54 interconnects the floating members 50 and separates the floating rolls about the same at each end when a larger amount of material appears at either end. The equalizer linkage comprises a U-shaped crank-type member with arms 55 at each side and links 56 pivotally connected to the arms 55 at the ends thereof and to the members 50 at an intermediate point between the floating sprockets. If one end is raised the link 56 and arm 55 on the opposite side will actuate the member 50 on the other side and raise the opposite end of the rolls. The links 56 are connected intermediately between the roll mountings on the members so that one roll does not pivot and raise the other roll.

As previously mentioned, the forage harvester is mounted on the right side of the tractor by the hitch bar 11 attached to a three-point hitch of the tractor. The hitch bar 11 is square in cross section. Side sheets 13 have right-angle plates 60 on the rear edges of the side sheets 13. The plates extend across the width of the harvester. The flange has a right angle configuration to conform to the hitch bar 11. The forage harvester is attached to the hitch bar 11 by two clamps 61, comprising clamp bolt 61a and a clamp 61b fastened together by nuts 61c. The forage harvester and row crop attachment are thereby securely fastened to the hitch bar 11.

The power transmission shaft 65 extends transversely from a gearbox (not shown) mounted on the hitch bar 11 to the rear of the power takeoff of the tractor and is connected thereto. At the forage harvester, the shaft 65 is rotatably mounted in the bearing 64 on the adjustable bracket 67 having slot 67a and fastening means 67b. On the inboard side is the large drive pulley 66 connected to the pulley 68 on the shaft 23 by the multibelt 69. On the outboard end of the shaft 65 is a sprocket 71 forming with the chain 73 and sprocket 74 the chain and sprocket drive 70. The sprocket 74 is mounted on shaft 76 which is rotatably mounted in a bearing on the outboard side sheet 13. Smaller sprockets 75, 77 are also mounted on the shaft 76. The sprockets 75 is coupled by chain 78 to the beveled gears 44 of the row crop attachment. The sprockets 76 is part of the rear feed roll drive 80.

The single chain drive 80 has sprockets 81 and 82 mounted on the upper floating roll and the lower fixed roll, respectively. An idler sprocket 83 is slideably mounted in a slot 84a in the arm 84. The arm 84 is pivotally attached to the floating sprocket 81 at the opposite end of the arm 84 from the idler sprocket. The arm 84 is intermediately and pivotally attached to the shaft 90 fixedly supported on the bracket 91 bolted to the outboard side sheet 13. The chain 85 meshes with the sprockets and back wraps around the sprocket 82 to rotate the rolls 32, 33 in opposite directions for peripheral movement in the same direction at the bite. The idler sprocket 83 is spring loaded by the helical spring 87 seated at one end against the bracket 88 affixed to arm 84 and at the other end against the sprocket yoke 89. The yoke rotatably supports the idler sprocket 83. The spring 87 creates chain tension and compensates for any inaccuracies in the sprockets in relation to the chain.

As previously mentioned, the arm 84 is pivotally mounted on the intermediately positioned shaft 90. As the roller 32 moves up, the idler sprocket 83 moves down to maintain the length of the chain path equal to the length of the chain. The sprockets 77, 81, 82 are in a generally vertical relation to one another and the idler sprocket is horizontally to the rear of the floating sprocket 81. This provides ample wrap around the sprockets 81, 82 and 77. The wrap around the sprockets 77 is about 150° and around the sprocket 81 about 145°. This provides ample torque transmission between the chain and the sprocket so that the chain does not slip or jump when high torques are applied. The idler spring 87 does not provide any adjustment in the length of the chain path. It merely functions to maintain the chain taut and counteract any inaccuracies between the sprocket and chain.

The idler sprocket and floating sprocket are rotatably mounted at opposite ends of a rigid member. The member has pivotal means positioned between the sprockets. The diameter of the sprockets and position of the pivot axis is set so that as the floating sprocket moves up and down the idler sprocket moves in the opposite direction to maintain the length of the path of the chain constant and the chain at the desired tautness for transference of high torques to the sprockets. The spring loading of the idler sprocket compensates for inaccuracies in the chain and set the desired tautness. The movement of the idler and floating sprockets is interrelated by the connecting arm or member and the location to the pivot axis relative to the size of sprockets and spacings so that the chain path length remains constant for different chain paths resulting from the variation of the spacing of the rolls, independent of spring loading on the sprocket. This constancy of length and tautness permits the transmission of high torques without the chain slipping or jumping.

While this invention has been described in connection with a signal embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, we claim:

1. In a forage harvester having a rotary cutter for chopping cut crops in cooperation with a shear bar, an upper floating roll, a lower fixed roll adjacent to said shear bar to feed crops in cooperation with said floating roll and having a drive with an input sprocket, sprockets on each of said rolls, an idler sprocket and chain meshing with said idler and input sprocket and said fixed and floating roll sprockets in reverse relation to rotate said rolls in opposite directions on driving by said input sprocket;

means pivotally mounted between said idler sprocket and said floating sprocket and rotatably attached to said floating sprocket to pivot with the movement thereof and rotatably supporting said idler sprocket means rotatably supporting said idler sprocket and said floating sprocket with said chain contacting said sprockets over a substantial arc opposite movement of said idler sprocket to said floating sprocket to maintain the chain path length and spacing between said idler and floating sprockets substantially constant and substantially independent of spring pressures for a given tautness.

2. In a forage harvester as set forth in claim 1 wherein pivotally mounting means is between said idler and floating sprockets.

3. In a forage harvester as set forth in claim 1 wherein said pivotal mounting means is a integral member having a single pivoting axis between said idler and floating sprocket.

4. In a forage harvester as set forth in claim 3 wherein said pivotal mounting means has a single pivoting axis between said idler and floating sprockets.

5. In a forage harvester as set forth in claim 1 wherein said pivotal mounting means is a linear integral member with said idler sprocket at one end and said floating sprocket at said other end and single pivoting axis between said idler and floating sprockets.

6. In a forage harvester as set forth in claim 1 wherein said idler sprocket is positioned rearwardly of said floating sprocket and generally at the same level to adequately wrap said chain on said floating sprocket.

7. In a forage harvester as set forth in claim 6 wherein said idler and floating sprockets are at the same level and said pivotal mounting means has a single axis of pivot between said idler and floating sprockets.

8. In a forage harvester as set forth in claim 5 wherein means are provided to slideably mount said idler sprocket on and generally longitudinally to said member under spring load for setting said chain at a given tautness.

9. In a forage harvester as set forth in claim 8 wherein said means for slideably mounting said idler sprocket comprises a slot in said member extending at a slight angle to the longitudinal of said member, a yoke rotatably supporting said idler sprocket and slidably mounted in said slot, a bracket mounted on said member and a helical spring between said yoke and bracket to force said idler sprocket against said chain.

* * * * *